United States Patent [19]

Strieter

[11] Patent Number: 5,558,112
[45] Date of Patent: Sep. 24, 1996

[54] PORTABLE ISOLATION ENCLOSURE AND PROCESS FOR CLEANING ENVIRONMENTS

[75] Inventor: Jerome F. Strieter, Silver Spring, Md.

[73] Assignee: Southern Concepts, Inc., Hyattsville, Md.

[21] Appl. No.: 410,747

[22] Filed: Mar. 27, 1995

[51] Int. Cl.⁶ .................................................. B08B 7/04
[52] U.S. Cl. .......................... 134/103.2; 15/301; 52/63; 55/DIG. 29; 55/356; 55/385.2; 134/104.2; 134/201; 135/900; 454/63
[58] Field of Search .................................. 134/201, 103.2, 134/103.3, 104.2, 104.3, 172; 15/301, 345; 312/1, 3; 55/DIG. 29, 356, 385.2; 454/56, 57, 63; 135/117, 900; 52/63

[56] References Cited

U.S. PATENT DOCUMENTS

| | | | |
|---|---|---|---|
| 3,766,844 | 10/1973 | Donnelly et al. | 55/385.2 X |
| 4,765,352 | 8/1988 | Strieter | 15/301 X |
| 4,920,768 | 5/1990 | Cares et al. | 312/1 X |
| 5,062,871 | 11/1991 | Lemon | 134/200 X |
| 5,080,701 | 1/1992 | Howard et al. | 134/201 X |
| 5,457,922 | 10/1995 | Fara | 312/1 X |

Primary Examiner—Philip R. Coe
Attorney, Agent, or Firm—Edward S. Irons

[57] ABSTRACT

A portable isolation enclosure apparatus for safely removing material from the walls of a building structure while isolating the portion of the walls from which the material is being removed. The apparatus includes an booth with an open top, a plurality of side walls, and at least one open side disposed between two of the side walls. The apparatus is positioned against the wall such that an area of the wall is isolated from the ambient environment and is disposed in the open side of the booth such that a worker located inside the booth can access the area of the wall. A frame is adjustably attached to the booth so as to extend above the top of the booth a desired distance. A vacuum filter system is provided for drawing air from outside the booth into the interior of the booth, filtering the air along with any airborne contaminants, and then exhausting clean air to the environment. A process for removing contaminated material from a wall of a building structure by isolating one area of the wall at a time from the surrounding environment is also provided.

16 Claims, 1 Drawing Sheet

PORTABLE ISOLATION ENCLOSURE AND PROCESS FOR CLEANING ENVIRONMENTS

BACKGROUND OF THE INVENTION

1. Field of the Invention

The present invention relates generally to portable isolation enclosures for use in cleaning environments and, more particularly, portable isolation enclosures for use in safely removing asbestos, lead or the like contaminated materials which are located on the surfaces of a building structure.

2. Description of Relevant Art

Various types of enclosures are known for isolating a dangerous or contaminated work area from the surrounding environment. For example, U.S. Pat. No. Reissue 33,810 discloses a portable isolation enclosure that includes an open top booth and an adjustable ceiling-contacting plenum. The plenum contacts and encloses a portion or area of the ceiling so that a worker located in the booth can remove the contaminated material, e.g., ceiling tiles containing asbestos, while such material is isolated from the ambient environment. The position of the ceiling-contacting plenum with respect to the booth is vertically adjustable to permit placement of the plenum against ceilings of different heights. A flexible plastic film is disposed between the plenum and the open top end of the booth to isolate the space between the plenum and the booth regardless of the relative position of the two members.

The portable isolation enclosure disclosed in the above-mentioned patent is provided with a portable HEPA (high efficiency particulate air) vacuum filter system which continuously filters air drawn into the enclosure and exhausts clean air to the environment. In addition, the enclosure is provided with a contaminated material disposal system for disposal of the material removed from the ceiling. Also, a shower unit is provided to wash and decontaminate a worker within the enclosure after completion of a given stage of asbestos removal. The portable isolation enclosure permits asbestos removal from occupied spaces without moving the occupants, furniture, etc., and without the construction of containments, thereby reducing the cost and disruption of asbestos abatement procedures. The portable isolation enclosure disclosed in the aforesaid patent has been used to safely abate over two million square feet of asbestos and lead contaminated ceilings in occupied buildings and is marketed by Southern Concepts, Inc. of Hyattsville, Maryland.

The portable isolation enclosure disclosed in the patent discussed above is primarily for use in removing contaminated material from ceilings or like elevated surfaces or structures. Thus, there remains a need in the art for a portable isolation enclosure specifically for use in removing asbestos tiles or contaminated material from additional surfaces or structures of occupied buildings, for example, building walls that contain such material, without requiring relocation of occupants, furniture, etc.

SUMMARY OF THE INVENTION

The present invention provides a portable enclosure apparatus for housing a worker during cleaning of an environment and, preferably, during the removal of asbestos or other contaminated material from the walls or other surfaces of a building or room. The enclosure includes a booth preferably provided with means for moving the booth from one location to another, and a frame secured to the booth so as to be vertically adjustable relative thereto. The booth is generally rectangular with an open top and includes a plurality of side walls and a bottom wall connected together to form a three-sided enclosure which is open at one side thereof. A plastic film or curtain is secured to the frame to isolate the space between the frame and the top of the booth from the surroundings. The enclosure is provided with a HEPA vacuum filter system for drawing air into the interior of the enclosure, filtering the air, and then exhausting clean air to the ambient environment.

The enclosure is utilized, for example, by positioning the open side of the booth against a vertical wall containing the asbestos or other contaminated material to be removed. A worker located within the enclosure can access the wall through the open side of the booth and, if desired, through the space between the booth and the frame by leaving such space uncovered by the plastic film or curtain extending between the booth and the frame. The enclosure may be provided with a shower system for cleaning and decontaminating the worker after completion of a particular stage of hazardous material abatement, and an auxiliary vacuum system may also be provided for removing debris from the worker or the interior of the enclosure.

In addition, the apparatus of the invention may have a removable bottom panel or portion to permit the worker to access material located beneath the booth. Further, the present invention provides a process for removing contaminated material from a wall of a building structure which includes steps of temporarily isolating a section of the wall within a portable isolation enclosure, removing the material from the wall section while preventing passage of the material or debris to the ambient environment outside of the enclosure, and moving the enclosure to another section of the wall to remove contaminated material therefrom.

DETAILED DESCRIPTION OF PREFERRED EMBODIMENTS

Figure 1:
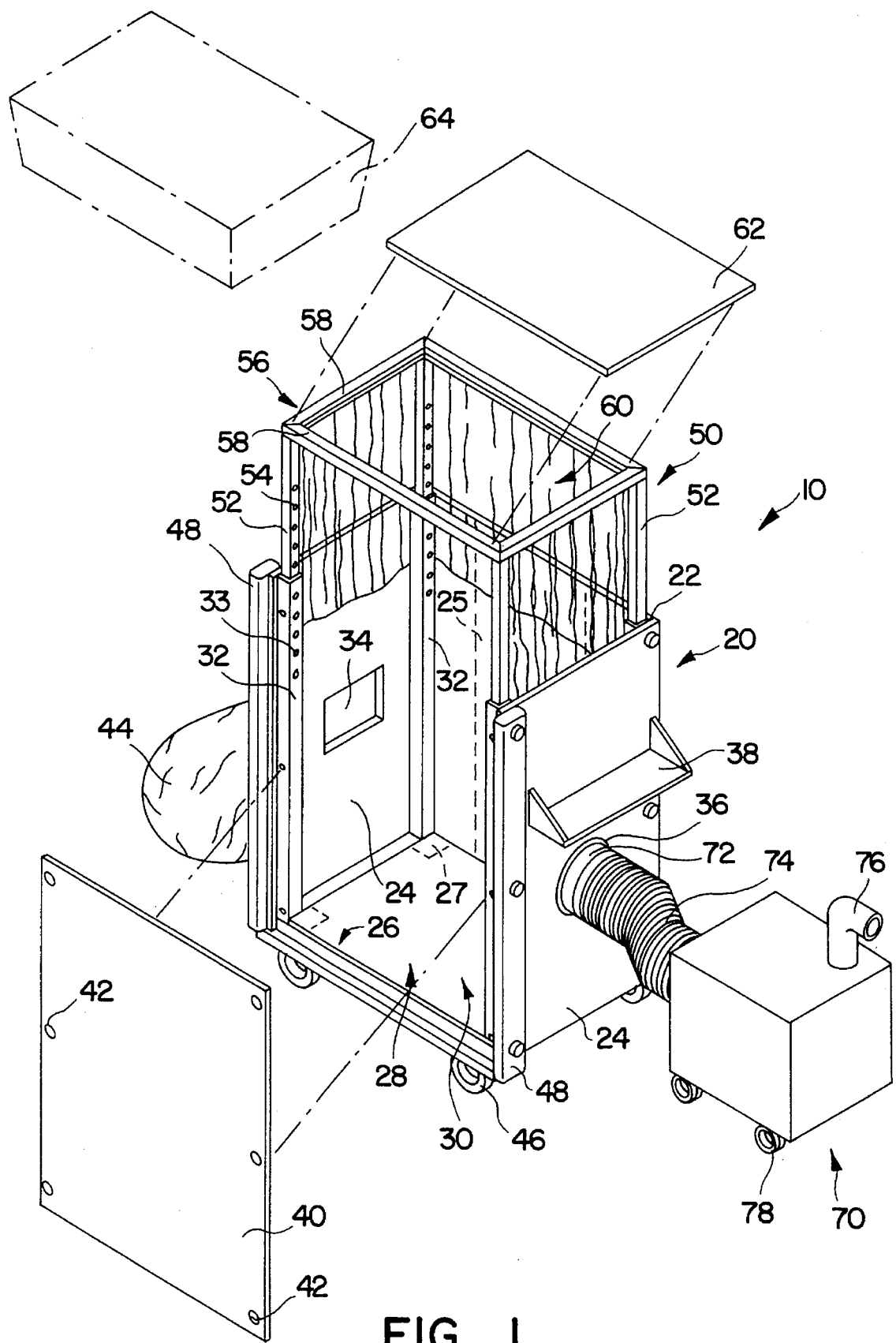
FIG. 1 is a perspective view of a preferred embodiment of the present invention.

Referring to FIG. 1, a preferred embodiment of a portable isolation enclosure for use in cleaning contaminated environments according to the present invention is indicated generally by the reference numeral 10 and comprises three primary components, an open top booth 20, an adjustable frame member 50 attached to the booth 20, and a HEPA (high efficiency particulate air) vacuum filter system 70. While the invention is primarily for use in cleaning contaminated environments, it should be appreciated that the invention may be used in many different applications involving either contaminated or non-contaminated material.

The booth 20 is preferably of a generally rectangular shape with an open top 22, a bottom 26 and a plurality of side walls 24 extending from the bottom 26 to the top 22. The booth 20 may be formed of metallic materials such as lightweight aluminum or other alloys, although other suitable materials may be used as well, e.g., rigid plastic materials, polyethylene sheeting, wood, etc. The booth 20 has an open side 28 which extends between two opposite side walls 24 to form a three-sided enclosure as seen in FIG. 1. One of the side walls 24 of booth 20 may have a door 25 (shown in phantom in FIG. 1) for entering and exiting the interior of the apparatus when it is positioned against a wall as discussed below. The door may be constructed as described in above-mentioned U.S. Pat. No. Reissue 33,810, the entire disclosure of which patent is incorporated herein by reference. It is possible to form the door as a panel or like member(s) which is retracted to an out-of-the-way position such that the door opening is used to access the building wall. In this case, the booth could include three side walls and the retractable door could act as a fourth side wall. The bottom 26 of booth 20 may include attachment members (indicated schematically at 27) for removably securing the bottom 26 to the booth 20 as discussed below.

A frame member 50 is adjustably secured to the booth 20 so as to extend away from the open top 22 of the booth. The frame 50 includes a plurality of vertical members 52 secured to a rectangular open top portion 56, which top portion 56 is comprised of a plurality of legs 58. The legs 58 may be secured to each other, and to the vertical members 52, by any suitable connection means, e.g., welds, bolts, etc. The vertical members 52 of frame 50 preferably have a plurality of openings or apertures 54 for adjustably securing the frame 50 to the booth 20. The booth 20 has secured thereto, or alternatively, formed integrally therewith, a plurality of channels or brackets 32 preferably disposed at the four corners of the booth 20. The channels 32 are hollow and sized to receive in telescoping fashion the vertical members 52 of frame 50. The channels 32 may have any suitable means for adjustably securing the frame 50 to the booth 20, such as openings 33 which can be aligned with the openings 54 in vertical frame members 52 at various relative positions of members 52 and channels 32 to receive fasteners. Of course, other means, for example but not limited to, clamps, screws, bolts, tape, etc. may be used to secure the frame 50 to booth 20. The respective members can be secured with the frame 50 located at a desired vertical position relative booth 20 by inserting suitable locking pegs or like members in the aligned openings 33, 54. In this manner, the frame 50 may be moved vertically relative booth 20 and locked at a desired position.

The frame 50 may also be secured to the booth 20 via the adjustable locking mechanism disclosed in the aforesaid patent, which mechanism includes parallel bars fixed to the frame that are slidably received in guide recesses formed in the walls of the booth, the bars and the recesses having mating apertures in which locking pegs are positioned to secure the respective members at the desired position.

The frame 50 preferably is provided with a closure 60 in the form of a film or curtain made of plastic or any other suitable air impervious material. The closure 60 may be attached to the top portion 56 of frame 50 so as to hang downward into the interior 30 of the booth 20 and, although not necessary, may be fastened to the interior of the side walls 24 of booth 20. As seen in FIG. 1, the closure or curtain 60 may extend around only three sides of the frame 50 and booth 20 and not cover the open side 28 of the booth or the side of the frame disposed immediately thereabove. However, the curtain 60 may extend completely around the frame 50 if desired. As will be described below, the open top portion 56 of frame 50 may be closed off by a panel 62 or it may be left open to provide additional air flow through the booth. Similarly, the closure 60 may be omitted to provide further air flow through the booth 20.

The booth 20 may have secured to the exterior of a side wall 24 thereof an optional shelf 38 for supporting various supplies (not shown) used in the removal of asbestos or other contaminated material, e.g., chemicals which aid in removing asbestos materials from the wall, chemicals which seal the area from which the materials have been removed, etc. In addition, the shelf may support containers of hot and cold water used by a worker inside the booth to shower or wash the interior of the booth after completion of a given stage of, for example, an asbestos abatement process. The supplies supported on shelf 38 have dispensing outlets passing through openings (not shown) in the side wall 24 which outlets are located in the interior 30 of booth 20 where they may be utilized by a worker located within the booth.

The portable isolation enclosure apparatus 10 is preferably provided with a waste disposal system for disposing of asbestos or other contaminated or non-contaminated material removed from the work area. The system may comprise an opening 34 in one of the side walls 24 of booth 20 and a receptacle or bag 44 disposed on the exterior of the booth. The construction of the waste disposal system may include a trap door which is biased closed and must be opened by the worker to pass debris out of the booth 20 as described in the aforesaid patent and thus will not be described in detail herein. Also, it is possible to locate the receptacle or bag 44 within the booth 20 in which case an opening in the side wall 24 would not be needed.

The portable isolation enclosure apparatus 10 is provided with a vacuum filter system 70 for continuously circulating air through the interior of the apparatus. The system 70 preferably is a HEPA vacuum filter system which provides powerful suction to draw air into the enclosure, e.g., 1000–1500 cubic feet per minute, and filters the drawn-in air and then exhausts clean air to the ambient surroundings. The details of the construction of the system 70 may be as described in the aforesaid patent, the disclosure of which is incorporated herein by reference, and thus will not be discussed at length herein. The vacuum filter system 70 includes an air inlet 72 secured to the booth 20 and passing into the booth interior 30 through an opening 36 in the side wall 24. The system 70 operates to continuously draw air from the ambient environment and into enclosure 10 and then into inlet 72. The air, along with any airborne particles or contaminants, is filtered by the system 70 which exhausts clean air to the ambient surroundings via air outlet 76. Those skilled in the art will recognize, of course, that a less powerful vacuum filter system may be used, or the filter omitted, if permitted by the particular application, e.g., for the removal of various non-hazardous materials.

As will be described below, the vacuum filter system 70 is preferably provided with wheels 78 for moving the system 70 along with the portable isolation apparatus 10 from one work area to another work area. However, the vacuum filter system 70 could be secured to the apparatus 10 if desired, for example to the exterior of one of the side walls 24, so as to be movable with the apparatus 10.

The portable isolation enclosure apparatus 10 may also be provided with a secondary vacuum system (not shown) having a suction nozzle or inlet disposed within the interior 30 of booth 20 for permitting the worker located inside the booth to vacuum debris or other material, e.g., before exiting the booth after completion of a given stage of the removal procedure. The secondary vacuum system may be constructed as disclosed in the aforesaid patent and thus will not be described further herein.

The apparatus 10 preferably is provided with bumpers 48 for contacting the wall adjacent the open side 28 of the booth 20 through which the worker accesses the material located on the wall. The edges of the side walls 24 which contact the wall being worked on often will not engage the wall in sealing fashion due to irregularities in the wall or the side walls 24. Thus, if the side walls 24 do not sealingly engage the wall, the area of the wall being worked on is not completely isolated from the ambient surroundings. More particularly, the spaces or gaps present between the side walls 24 and the wall form a path for contaminated debris to pass from inside the apparatus 10 to outside the apparatus, thus compromising the isolation of the work area from the ambient surroundings.

To overcome this problem, the apparatus is positioned with the bumpers 48 contacting the wall (not shown) and serving to isolate the area of the wall located between the bumpers. The bumpers 48 are preferably formed of a flexible or semi-flexible material which sealingly engages the wall to isolate the area of the wall being worked on despite irregularities in the side walls 24 of the booth 20 or the wall. The bumpers 48 are shown secured to opposite side walls 24 (left and right in FIG. 1) so as to extend outwardly away from the open side 28 of the booth 20. A bumper also is secured to the bottom of the booth 20 and extends outwardly from the booth. When the bumpers 48 are positioned against the wall, the area being worked on is substantially completely isolated from the ambient surroundings and debris removed from the wall is contained within the apparatus 10.

Those skilled in the art will recognize, of course, that the bumpers 48 are but one means for engaging the apparatus 10 with the wall to isolate the contaminated work area and prevent debris from exiting the isolated enclosure. Any suitable sealing structure, e.g., tape, a rubber flange, etc., may be used. Also, the sealing structure may be separate from and attached to the booth or it may be formed integrally with the booth. In addition, and depending on the particular application of the apparatus 10, it may be possible to utilize the apparatus without the bumpers 48, e.g., in non-hazardous applications.

The preferred operation of the apparatus 10 will now be described. The apparatus preferably is provided with means for being moved which may be wheels on the bottom of the booth, or alternatively, the booth may be positioned on a movable support member. In any case, the apparatus is moved to and positioned at a desired location with an area of a wall containing contaminated material disposed within the open side 28 of the booth 20. The bumpers 48 or other sealing means cause the booth to sealingly engage the wall so as to isolate the work area from the surrounding environment. The worker may enter the enclosure apparatus through the door 25 of the booth 20 and the vacuum filter system 70 then activated to ventilate the enclosure. The apparatus 10 could be moved manually or it could be provided with a self-propelled motive means for moving the enclosure when the worker is inside the booth. As the worker removes the contaminated material he places the material in the disposal bag. The high rate of air flow continuously ventilates the interior of the apparatus 10 and discharges clean air to the ambient environment. The sealing engagement of the booth 20 with the wall prevents any debris removed from the wall from exiting the isolated enclosure. After a first area of the wall has been suitably treated, the apparatus 10 and vacuum filter system 70 are moved to another area of the wall to be isolated from the surroundings and the process is repeated.

For certain applications, it may be necessary to provide additional air flow passage(s) to ventilate the apparatus 10. That is, if the booth is placed against the wall with no space therebetween the system 70 may not properly ventilate the enclosure due to the considerable suction generated by the system and inadequate air flow into the enclosure. However, this problem may be overcome by partially opening or removing the closure 60 and/or the top panel 62 to permit air to rush in the top end of the enclosure, thus adequately ventilating the interior of the apparatus 10. Such venting typically will not compromise the isolation of the work area because the air being drawn into the top, along with gravitational forces, will prevent debris from escaping upwardly from the enclosure. However, this usually will not be the case should an opening be provided at or below the height at which the removal process is being performed. The adjustable frame 50 permits substantially the entire wall surface from floor to ceiling to be isolated from the ambient surroundings by the apparatus 10 due to the ability to move the frame 50 vertically relative the booth 20.

The present invention permits one portable isolation enclosure apparatus to be used for removing asbestos or contaminated materials from walls, ceilings, or, as described below, floor structures. The use of the present invention to remove such material from walls has been described above. In order to remove ceiling tiles or the like elevated structures, a plenum 64 (shown in phantom) constructed in accordance with the disclosure of the aforesaid patent may be attached to the top portion 56 of frame 50 in lieu of panel 62. The plenum 64 extends from the frame 50 to the ceiling of the room and permits the worker to perform the abatement procedure on the section of the ceiling enclosed within the plenum.

Another aspect of the present invention provides a bottom 26 of booth 20 which is removable, in whole or in part, to provide an opening through which a worker located inside the booth can access asbestos or other contaminated material disposed beneath the booth, e.g., floor tiles. The bottom 26 may be secured to the booth 20 by any suitable connection that permits removal of the bottom or a portion thereof, such connection being indicated schematically at 27. The removable bottom feature may be used in addition to, or in place of, the open side 28 which is used to access a wall.

For example, when using the apparatus 10 to remove floor tiles, the bottom 26 may be removed and the apparatus positioned to overlie the area of the floor on which the abatement process will start. However, such an area may be spaced from the wall being treated and thus the open side 28 of the booth will not be positioned adjacent to or against the wall. Accordingly, the work area is not isolated from the ambient environment. In this situation, the open side 28 of booth 20 may be closed off with a removable panel 40 or the like via attachment members (not shown) passing through apertures 42 in panel 40. Also, because gaps may be present between the bottom of the booth and the floor, closure members can be used to essentially extend the side walls all the way to the floor so as to enclose and isolate the floor area disposed beneath the booth 20. After positioning the apparatus 10 at the desired location, the worker may enter the booth 20 through the door 25 and the vacuum filter system 70 then activated. The system 70 draws air into the enclosure apparatus 10 for ventilating same and exhausting clean air to the ambient environment.

It is apparent that the present invention provides an improved portable isolation enclosure apparatus for cleaning contaminated or non-contaminated environments alike, and in particular, permits the removal of asbestos or other contaminated materials from the walls or floors of an occupied room or other facility without the need for relocating the occupants, furniture, etc.

Other features and advantages of the present invention will readily occur to those skilled in the art, as will many modifications and alterations in the preferred embodiments of the invention described herein, all of which may be achieved without departing from the spirit and the scope of the invention as defined by the appended claims.

What is claimed is:

1. A portable isolation enclosure apparatus for cleaning areas located on wall structures, the apparatus comprising:

a booth including an open top and a plurality of side walls extending away from the open top to form a partially closed-wall structure with an interior sufficiently large to accommodate a worker, the booth having an open side extending from one of said plurality of side walls to another of said plurality of side walls which faces the one side wall, the open side providing a worker located in the interior of the booth access to an area on a wall located adjacent to the booth;

a frame member adjustably connected to the booth and spaced above the booth a longitudinal distance which is adjustable to permit the frame member to be moved vertically toward or away from the open top of the booth;

a plurality of adjustable length connectors, each connector being attached to the frame member and to the booth, the plurality of adjustable length connectors securing the frame member to the booth to permit adjustment of the vertical position of the frame member relative the open top of the booth; and vacuum and filter means for drawing air from the exterior of the booth into the interior of the booth, and filtering the air drawn into the interior of the booth along with any airborne contaminants and discharging clean air to the exterior of the booth;

whereby the portable isolation enclosure apparatus can be positioned against a wall with the open side of the booth isolating an area on the wall which is located on the exterior of the booth, and a worker can access the area from inside the booth.

2. An apparatus according to claim 1, further comprising waste receiving means connected to one of said plurality of side walls for receiving waste and debris removed from the area.

3. An apparatus according to claim 1, further comprising a shower system with an outlet nozzle disposed within the booth for washing the interior of the booth and the worker therein.

4. An apparatus according to claim 1, further comprising an aperture in one of the plurality of side walls in which is disposed an outlet for dispensing material used to treat the area.

5. An apparatus according to claim 1, wherein the vacuum and filter means is a high efficiency particulate air system.

6. An apparatus according to claim 1, wherein the apparatus is movable from one location to another location.

7. An apparatus according to claim 6, wherein the vacuum and filter means comprises a movable system disposed outside the booth with an air inlet communicating with the interior of the booth.

8. An apparatus according to claim 1, wherein the booth has a sealing member for contacting the wall and substantially sealing the apparatus against the wall to isolate the area of the wall disposed within the open side of the booth from the ambient surroundings.

9. An apparatus according to claim 8, wherein the sealing member includes a plurality of bumpers which are secured to one of the plurality of side walls and extends away from an end of the one side wall a predetermined distance beyond the open side of the booth to sealingly engage the wall.

10. An apparatus according to claim 1, wherein each of the plurality of adjustable length connectors comprises first and second telescoping members, the first telescoping member being fixed to the frame member and the second telescoping member being fixed to the booth, and wherein the first telescoping member is adjustably connected to the second telescoping member to permit adjustment of the vertical position of the frame member relative the open top of the booth.

11. An apparatus according to claim 1, further comprising a side wall attached to the booth and manipulated to permit the open side of the booth to be opened or closed.

12. An apparatus according to claim 1, further comprising a detachable side wall separate from the booth and removably attachable to the booth to permit the open side of the booth to be opened or closed.

13. An apparatus according to claim 1, further comprising a detachable member removably attached to the frame member to close off the top of the apparatus.

14. An apparatus according to claim 1, further including a closure member extending from the frame member to the booth, the closure member at least partially enclosing and sealing the space formed between the frame member and the open top of the booth at various relative positions of the frame member and booth.

15. A portable isolation enclosure apparatus for cleaning contaminated areas located on substantially vertical walls or substantially horizontal floors, the apparatus comprising:

a booth including a bottom, an open top and a plurality of side walls extending from the bottom toward the open top in a substantially vertical direction to form a closed-wall structure with an interior sufficiently large to accommodate a worker;

wherein at least a portion of the bottom of the booth is removably connected to the booth and is removable therefrom to provide a first opening through which a worker located inside the apparatus can access a substantially horizontal floor area disposed outside and beneath the booth, and wherein at least one of the side walls is removably connected to the booth and is removable therefrom to provide a second opening through which a worker located inside the apparatus can access a substantially vertical wall area located outside of the booth;

a frame member adjustably connected to the booth and spaced above the open top of the booth a longitudinal distance which is adjustable to permit the frame member to be moved vertically toward or away from the open top of the booth;

a plurality of adjustable length connectors, each connector having two ends with one end attached to the frame member and another end attached to the booth, the plurality of adjustable length connectors securing the frame member to the booth to permit adjustment of the vertical position of the frame member relative the open top of the booth; and vacuum and filter means for drawing air from the exterior of the booth into the interior of the booth, filtering the air drawn into the interior of the booth along with any airborne contaminants and discharging clean air to the exterior of the booth;

whereby the apparatus may be positioned with the portion of the bottom of the booth removed or the at least one side wall removed such that a worker can access contaminated areas located outside the apparatus from inside the booth.

16. An apparatus according to claim 15, further comprising a closure member extending from the frame member to the booth, the closure member at least partially enclosing and sealing the space formed between the frame member and the open top of the booth at various relative positions of the frame member and booth.

* * * * *